(12) United States Patent
Nakai et al.

(10) Patent No.: US 9,376,069 B2
(45) Date of Patent: Jun. 28, 2016

(54) GROMMET AND ATTACHMENT MEMBER WITH GROMMET

(71) Applicant: SUMITOMO WIRING SYSTEMS, LTD., Mie (JP)

(72) Inventors: Hirokazu Nakai, Mie (JP); Masashi Sawada, Mie (JP); Tomohiro Yabashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/427,762

(22) PCT Filed: May 14, 2013

(86) PCT No.: PCT/JP2013/063395
§ 371 (c)(1),
(2) Date: Mar. 12, 2015

(87) PCT Pub. No.: WO2014/045634
PCT Pub. Date: Mar. 27, 2014

(65) Prior Publication Data
US 2015/0318679 A1 Nov. 5, 2015

(30) Foreign Application Priority Data

Sep. 18, 2012 (JP) ................................ 2012-203926

(51) Int. Cl.
*H02G 3/22* (2006.01)
*F16L 5/02* (2006.01)
(Continued)

(52) U.S. Cl.
CPC ............. *B60R 16/02* (2013.01); *B60R 16/0222* (2013.01); *H01R 13/52* (2013.01); *H02G 3/22* (2013.01); *Y10T 16/063* (2015.01)

(58) Field of Classification Search
CPC ... Y10T 16/05; Y10T 16/063; B60R 16/0222; B60R 16/0207; B60R 16/0215; H02G 3/22; H02G 3/0468; H02G 3/0481; H02G 15/013; F16L 5/10; F16B 5/0258; F16B 43/001; H01R 13/5205; H01R 13/5208
See application file for complete search history.

(56) References Cited

U.S. PATENT DOCUMENTS

| 2,311,427 | A | * | 2/1943 | Winkelmeyer | ...... | H02G 3/0616 16/108 |
| 3,609,214 | A | * | 9/1971 | Totsuka | ............... | H02G 3/0616 174/135 |

(Continued)

FOREIGN PATENT DOCUMENTS

| JP | 09037442 | A | * | 2/1997 |
| JP | 09039688 | A | * | 2/1997 |

(Continued)

OTHER PUBLICATIONS

Search report from PCT/JP2013/063395, mail date is Jul. 16, 2013.

*Primary Examiner* — Chuck Mah
(74) *Attorney, Agent, or Firm* — Greenblum & Bernstein, P.L.C.

(57) ABSTRACT

At the end portion of a wire harness that is connected through a through hole of a casing, a shielding shell is fixed to the casing and covers a connector for a harness attached to the end portion of the wire harness. A grommet covers the outside of the shielding shell. The grommet includes a main portion and a band-fastened portion, and a skirt portion extends from the band-fastened portion. A bundling band fastens the outer circumferential surface of the connecting portion via the band-fastened portion, and the skirt portion is brought into intimate contact with the outer circumferential surface of a step portion that is continuous with the connecting portion. Sealing lips that receive fastening force by the bundling band and come into intimate contact with the outer circumferential surface of the connecting portion in a squeezed state are formed on the inner circumferential surface of the band-fastened portion.

8 Claims, 7 Drawing Sheets

(51) Int. Cl.
*B60R 16/02* (2006.01)
*H01R 13/52* (2006.01)

(56) References Cited

U.S. PATENT DOCUMENTS

| | | | | |
|---|---|---|---|---|
| 4,373,112 A * | 2/1983 | Mizuno | ............... | H02G 3/0683 174/153 G |
| 5,452,494 A * | 9/1995 | Wright | ............... | F16L 41/088 16/2.2 |
| 5,588,858 A * | 12/1996 | Lester | ............... | H01R 13/743 439/275 |
| 5,722,699 A * | 3/1998 | Brancher | ............... | E03F 3/04 285/142.1 |
| 5,732,440 A * | 3/1998 | Wright | ............... | H02G 3/083 16/2.2 |
| 5,961,155 A * | 10/1999 | Youngs | ............... | F16L 5/06 277/634 |
| 6,162,087 A | 12/2000 | Hiura | | |
| 6,438,828 B1 * | 8/2002 | Uchiyama | ............. | H02G 3/088 174/152 G |
| 6,600,105 B2 * | 7/2003 | Nakata | ............... | H01R 13/743 16/2.1 |
| 6,779,243 B2 * | 8/2004 | Nakata | ............... | B60R 16/0222 174/153 G |
| 2008/0017401 A1 * | 1/2008 | Uchida | ............... | B60R 16/0222 174/153 G |
| 2010/0307794 A1 * | 12/2010 | Baydoun | ............... | H02G 3/22 174/152 G |
| 2011/0045701 A1 | 2/2011 | Tsuruta | | |

FOREIGN PATENT DOCUMENTS

| | | | | |
|---|---|---|---|---|
| JP | 10-294146 | 11/1998 | | |
| JP | 2003-230214 | 8/2003 | | |
| JP | 2009-115217 | 5/2009 | | |
| JP | 2011-44354 | 3/2011 | | |
| WO | WO 2009113220 A1 * | 9/2009 | ........... | B60R 16/0222 |

* cited by examiner

GROMMET AND ATTACHMENT MEMBER WITH GROMMET

TECHNICAL FIELD

The present invention relates to a grommet and an attachment member with a grommet.

BACKGROUND ART

Conventionally, when water resistance is required for a portion in which an electric wire group is passed through a hole that penetrates a wall, a sealing structure is provided around the hole. The sealing structure described in Patent Document 1 is known as such a sealing structure for a penetrated portion. In this sealing structure, a grommet through which the electric wire group (wire harness) is inserted is attached to the wall provided with a through hole, and a flexible lip having a large diameter that is provided in the grommet is brought into elastic contact with the periphery of the through hole to seal the through hole.

CITATION LIST

Patent Documents

Patent Document 1: JP 2003-230214A

SUMMARY OF THE INVENTION

Technical Problem

On the other hand, in hybrid vehicles or the like, the wire harness is routed between a motor and an inverter, for example. The electric wire group is introduced into the motor through a hole penetrating a motor case. However, even when the above-described conventional sealing structure is used for this structure, it is not necessarily sufficient as a sealing structure. This is because it is necessary to be prepared for the case that high-pressure washing water is blown to wash automobiles including hybrid vehicles. In such a case, in the above-described sealing structure, a channel for preventing water infiltration is short and there is a concern that, for example, the lip turns up. Therefore, it is not possible to meet demand for high sealing performance.

The present invention was made based on the foregoing circumstances, and it is an object thereof to provide a grommet and an attachment member with a grommet that can achieve high water resistance.

Solution to Problem

The grommet of the present invention is a grommet having a main portion for covering a tubular connecting portion of an attachment member in a state where electric wires are inserted through an opening, the attachment member including the connecting portion having the opening at one end and a step portion formed to be continuous with the other end of the connecting portion and to have a larger diameter than the connecting portion, and the grommet includes a skirt portion that extends from the main portion and is for covering the step portion, and a band-fastened portion that is formed in a recess groove shape in a circumferential direction and connects the main portion and the skirt portion, and has an inner circumferential surface to be brought into intimate contact with the connecting portion by being fastened by a bundling band from an outside.

Moreover, the attachment member with a grommet of the present invention is an attachment member with a grommet including an attachment member including a tubular connecting portion having an opening at one end and a step portion formed to be continuous with the other end of the connecting portion and to have a larger diameter than the connecting portion, and a grommet having a main portion for covering the connecting portion in a state where electric wires are inserted through the opening, wherein the grommet includes a skirt portion that extends from the main portion and is for covering the step portion, and a band-fastened portion that is formed in a recess groove shape and connects the main portion and the skirt portion, and has an inner circumferential surface to be brought into intimate contact with the connecting portion by being fastened by a bundling band from an outside.

Advantageous Effects of the Invention

In the grommet and the attachment member with a grommet of the present invention, the skirt portion extends from the band-fastened portion, and therefore, it is possible to enhance water resistance compared with a grommet in the form in which the band-fastened portion is an end portion. Moreover, since the band-fastened portion is formed in a recess groove shape between the skirt portion and the main portion, the bundling band is positioned therebetween, and thus it is possible to stabilize a fastening state.

DESCRIPTION OF EMBODIMENTS

Preferred embodiments of the present invention will be described.

(1) The grommet and the attachment member with a grommet of the present invention may have a configuration in which the band-fastened portion is provided with projecting portions that project from the inner circumferential surface and are to be brought into intimate contact with the connecting portion by being fastened by the bundling band.

With this configuration, the projecting portions receive a fastening force by the bundling band and come into strongly intimate contact with the outer circumferential surface of the connecting portion, and therefore, it is possible to enhance the sealing performance. Moreover, since the projecting portions are provided on the inner circumferential surface of the band-fastened portion, it is not possible to observe the intimate contact state from the outside. However, the band-fastened portion is formed in a recess groove shape, and thus the bundling band is automatically positioned when attached thereto. Accordingly, the projecting portions are reliably brought into intimate contact therewith by the bundling band, and therefore, the observation from the outside is not needed.

(2) Moreover, a configuration may be adopted in which auxiliary projecting portions project from the inner circumferential surface of regions outside the region that is to be fastened by the bundling band in the band-fastened portion.

With this configuration, a sealing function by auxiliary projecting portions in addition to that by the projecting portions is also added, it is possible to further enhance the sealing function. In addition, since the auxiliary projecting portions are disposed outside the region in which the bundling band is disposed and do not directly receive the fastening force by the bundling band, the auxiliary projecting portions are not likely to be worn out compared with the projecting portions, and thus it is possible to maintain the sealing function for a long period of time.

(3) Furthermore, a cut-out portion may be formed in a partial region of an opening edge of the skirt portion by cutting out that region toward the one end, and ribs may be formed in regions outside the cut-out portion to extend from the one end side to the other end side.

If the cut-out portion is formed in the partial region of the skirt portion, the skirt portion is likely to turn up in that region compared with in other regions when receiving high-pressure washing water. However, if the ribs are formed in that region, it is possible to suppress the turning up and to enhance the sealing function.

Embodiment 1

Hereinafter, Embodiment 1, which is a specific embodiment of the present invention, will be described with reference to the drawings. It should be noted that in the description below, the terms "front and rear" are defined so that a direction of moving away from a casing 1 is "rear" and a direction of approaching the casing 1 is "front".

Figure 1:
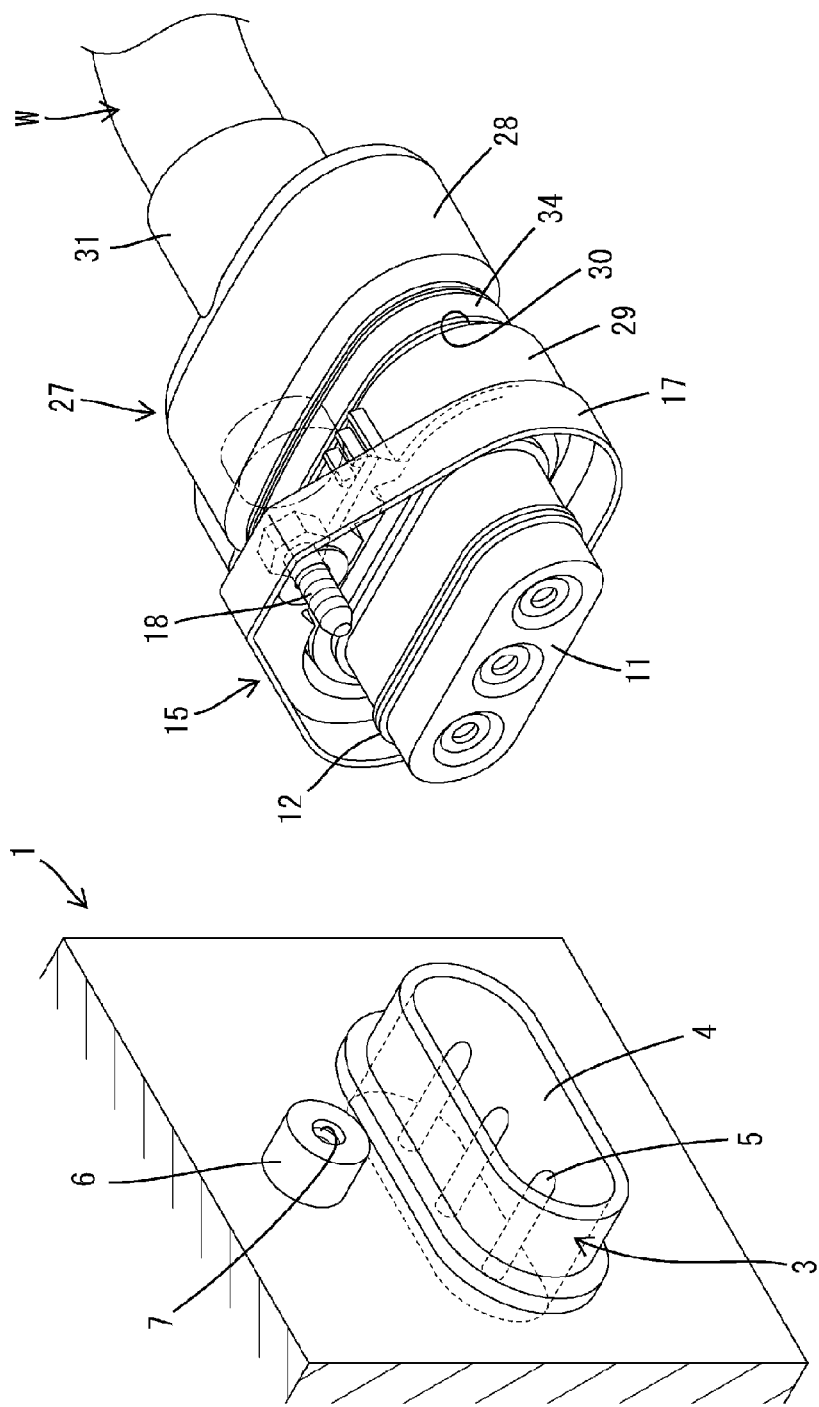
FIG. 1 is an exploded perspective view illustrating a connection between an end portion of a wire harness and a casing.

FIG. 1 shows a connection, for example, on an inverter side in a case where a motor and an inverter of a hybrid vehicle are connected by a bundle of a plurality of electric wires (wire harness W).

Figure 4:
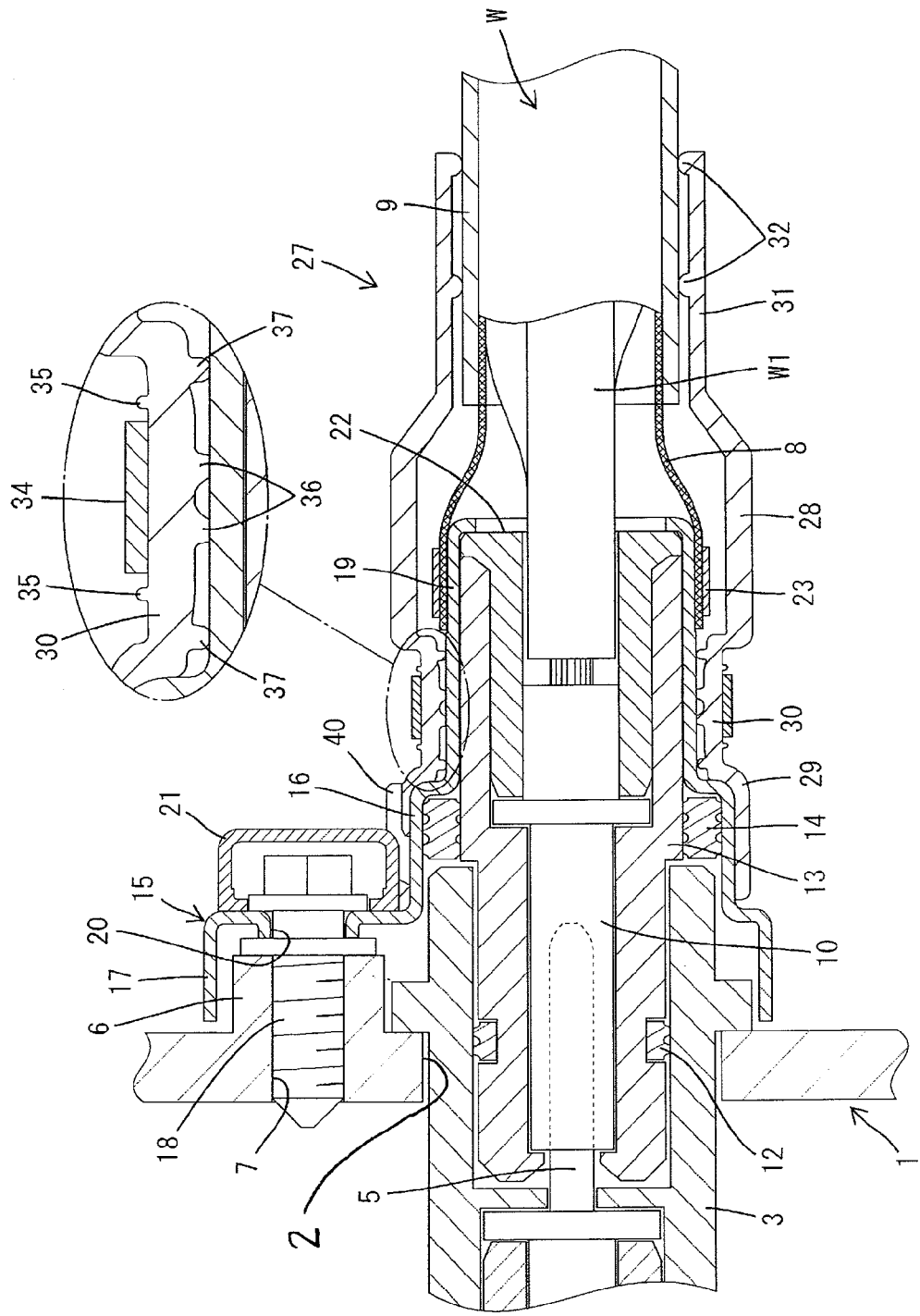
FIG. 4 is a cross-sectional side view illustrating a state where the end portion of the wire harness is connected to the casing.

As shown in FIG. 1 and FIG. 4, a through hole 2 is opened at a connecting portion of the casing 1 (made of metal) on the inverter side, and a casing-side connector 3 is attached to the inside of the through hole 2, projecting outward. A hood portion 4 of the casing-side connector 3 is formed in an oval shape that is elongate in the width direction, and three male terminal fittings 5 are accommodated in the hood portion 4 and are arranged in a row. Moreover, a boss portion 6 projects forward from the portion above the through hole 2 on the outer surface of the casing 1, and a bolt hole 7 (screw hole) is provided at the central portion of the boss portion 6.

In this embodiment, the wire harness W includes three electric wires W1. As shown in FIG. 4, the electric wires W1 included in the wire harness W are collectively covered from the outside with a braided wire 8 and an outer cover 9 that is located outside the braided wire 8. Moreover, a female terminal fitting 10 is connected to the end of each electric wire W1. The female terminal fittings 10 are respectively accommodated in corresponding cavities in a harness-side connector 11. The harness-side connector 11 is formed to be capable of being fitted to the hood portion 4 of the casing-side connector 3, and the male and female terminal fittings 5 and 10 are electrically connected to each other in a proper fitting state. Moreover, a first sealing ring 12 is fitted to a portion on the front end portion side of the outer circumferential surface of the harness-side connector 11, and thus comes into intimate contact with the inner circumferential surface of the hood portion 4 and seals between both portions. A step 13 is formed at an intermediate portion in the longitudinal direction on the outer circumferential surface of the harness-side connector 11, and a second sealing ring 14 is fitted to a portion near the border of the step 13. The second sealing ring 14 comes into intimate contact with the inner circumferential surface of a step portion 16 of a shielding shell 15 (attachment member), which will be described later, in a water-tight state.

Figure 6:
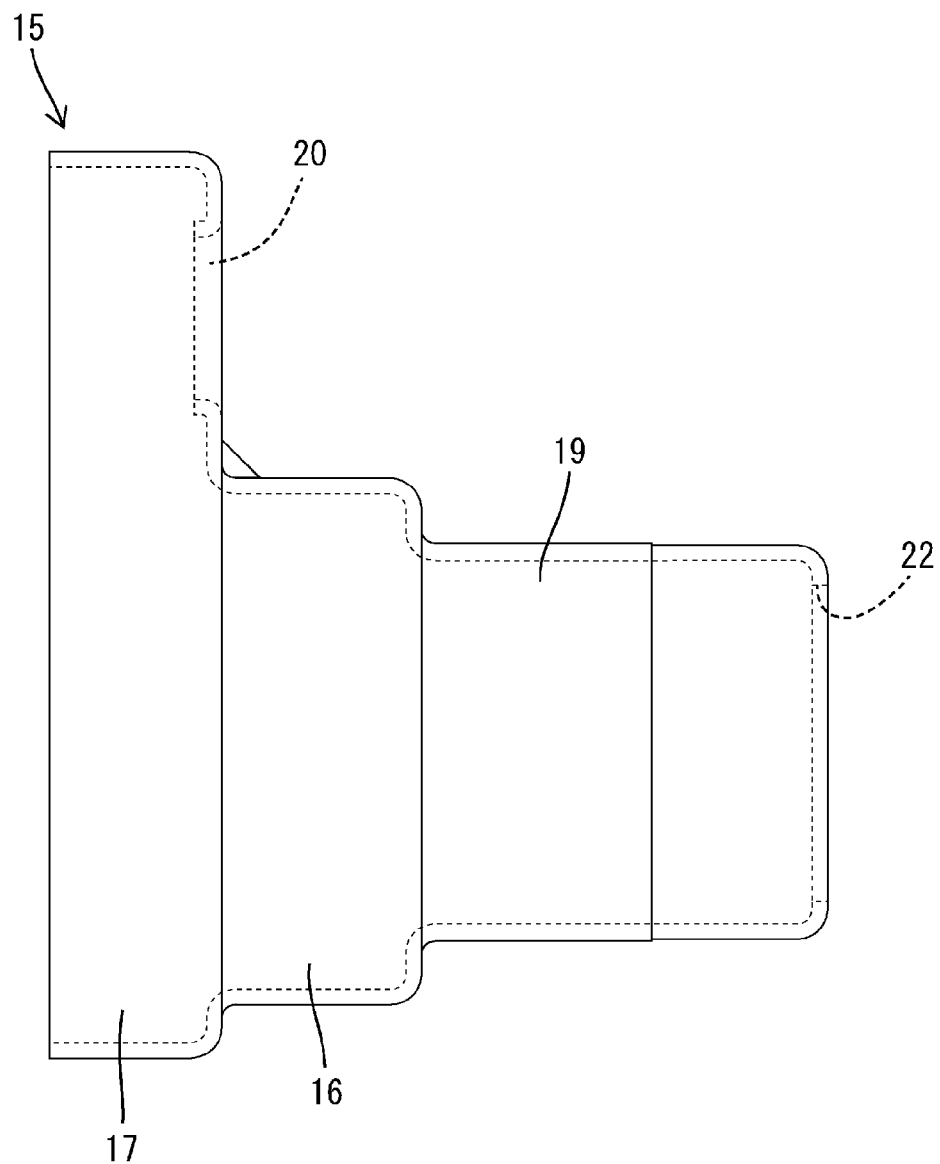
FIG. 6 is a side view of a shielding shell.
Figure 7:
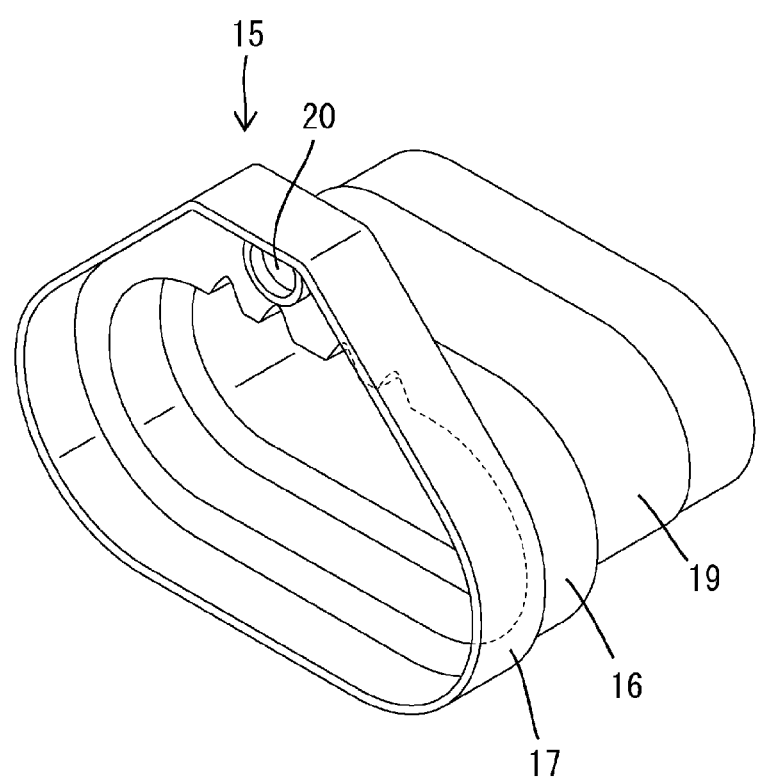
FIG. 7 is a perspective view of the shielding shell.

The wire harness W is inserted through the shielding shell 15 as shown in FIG. 4, and the harness-side connector 11 is accommodated in the shielding shell 15 in a state where the harness-side connector 11 projects forward from the shielding shell 15 as shown in FIG. 1. A metal plate is formed into a tubular shape as the shielding shell 15, and as shown in FIG. 6 and FIG. 7, the front end portion thereof is provided with a cap portion 17. As shown in FIG. 1, the cap portion 17 is open toward the casing 1 side, and has a substantially mountain-like shape in which the center on the upper end side in the drawing is a peak. A fixing bolt 18 is attached to the peak portion of the cap portion 17 through an insertion hole 20 from the rear surface side in a penetration state. The shielding shell 15 is fixed to the casing 1 by screwing the fixing bolt 18 into the bolt hole 7 on the casing 1 side.

It should be noted that the head of the bolt 18 is removably covered with a bolt cap 21 after the bolt 18 is screwed in. In this embodiment, the bolt cap 21 is connected, via a string-shaped hinge piece 26, to an attachment tool (not shown) that is fixed together with the bolt 18.

As shown in FIG. 6, the step portion 16 extends rearward from the cap portion 17, and a connecting portion 19 extends further rearward from the step portion 16. Both the connecting portion 19 and the step portion 16 are formed to have an oval cross section that is elongate in the width direction (horizontal direction). An opening 22 is formed on the rear end surface of the connecting portion 19, and the wire harness W can be inserted through the opening 22 (see FIG. 4). As shown in FIG. 4, the outer circumferential surface of the rear end portion of the connecting portion 19 is covered with the braided wire 8. An annular fastening tool 23 is tightened by screwing a screw 24, and thus the braided wire 8 is fastened and fixed to the connecting portion 19.

Figure 3:
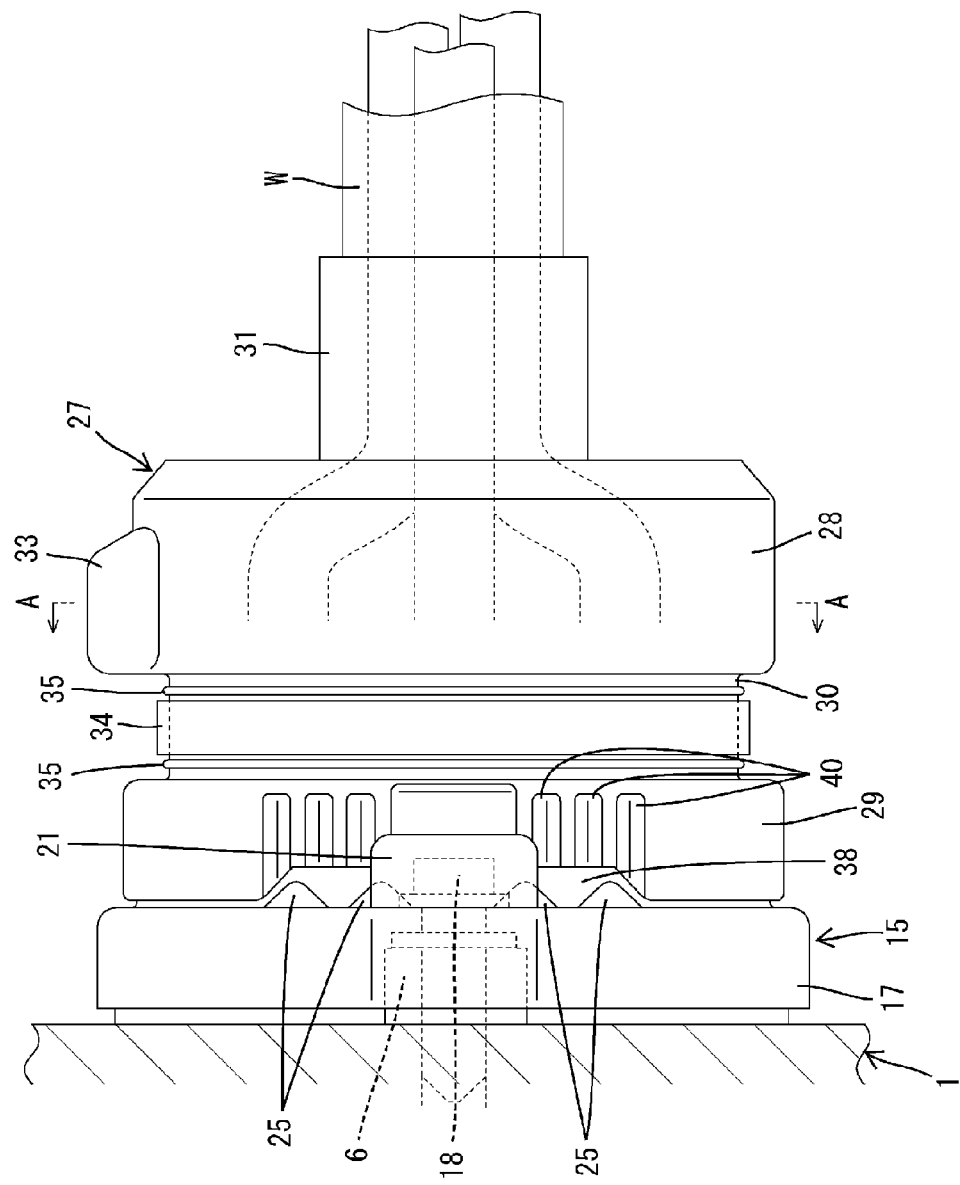
FIG. 3 is a plan view illustrating a state where the end portion of the wire harness is connected to the casing.
Figure 5:
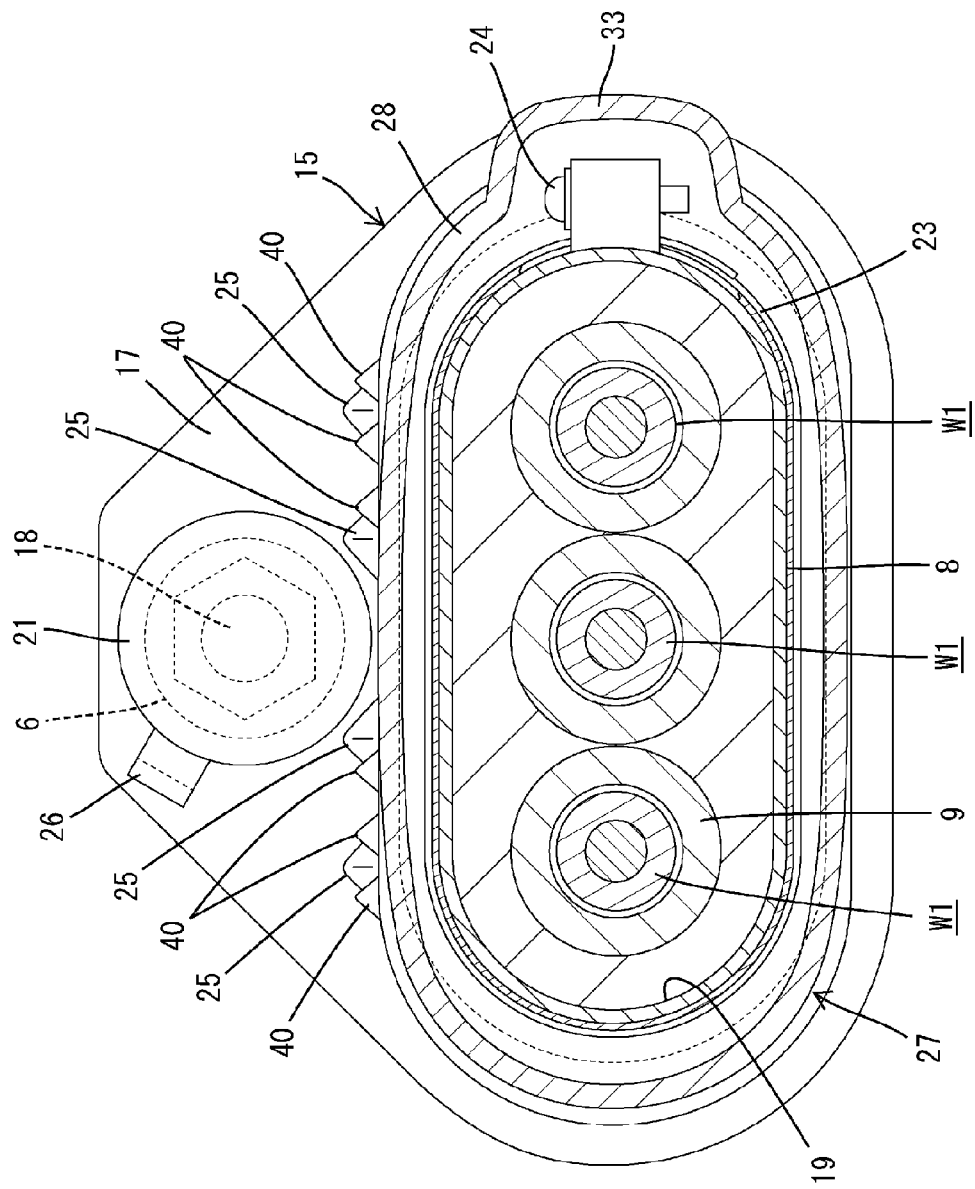
FIG. 5 is a cross-sectional view taken along line A-A shown in FIG. 3.

The step portion 16 and the connecting portion 19 are coaxially arranged. The step portion 16 is formed to be slightly larger than the connecting portion 19, having an oval cross section, and is shorter in the front-rear direction than the connecting portion 19. The step portion 16 is continuous with the height position on the lower end portion side of the cap portion 17, and the bolt 18 is disposed at the height position spaced apart from the upper surface of the step portion 16. As shown in FIG. 3 and FIG. 5, two reinforcing ribs on both sides interposing the bolt cap 21 in the width direction, that is, four reinforcing ribs 25 in total, are formed by striking so as to project forward from the rear surface of the cap portion 17 at the border portion with the upper surface of the step portion 16. The second sealing ring 14 of the harness-side connector 11 is caused to abut against the step between the step portion 16 and the connecting portion 19, and thereby the harness-side connector 11 is positioned in the front-rear direction.

Figure 2:
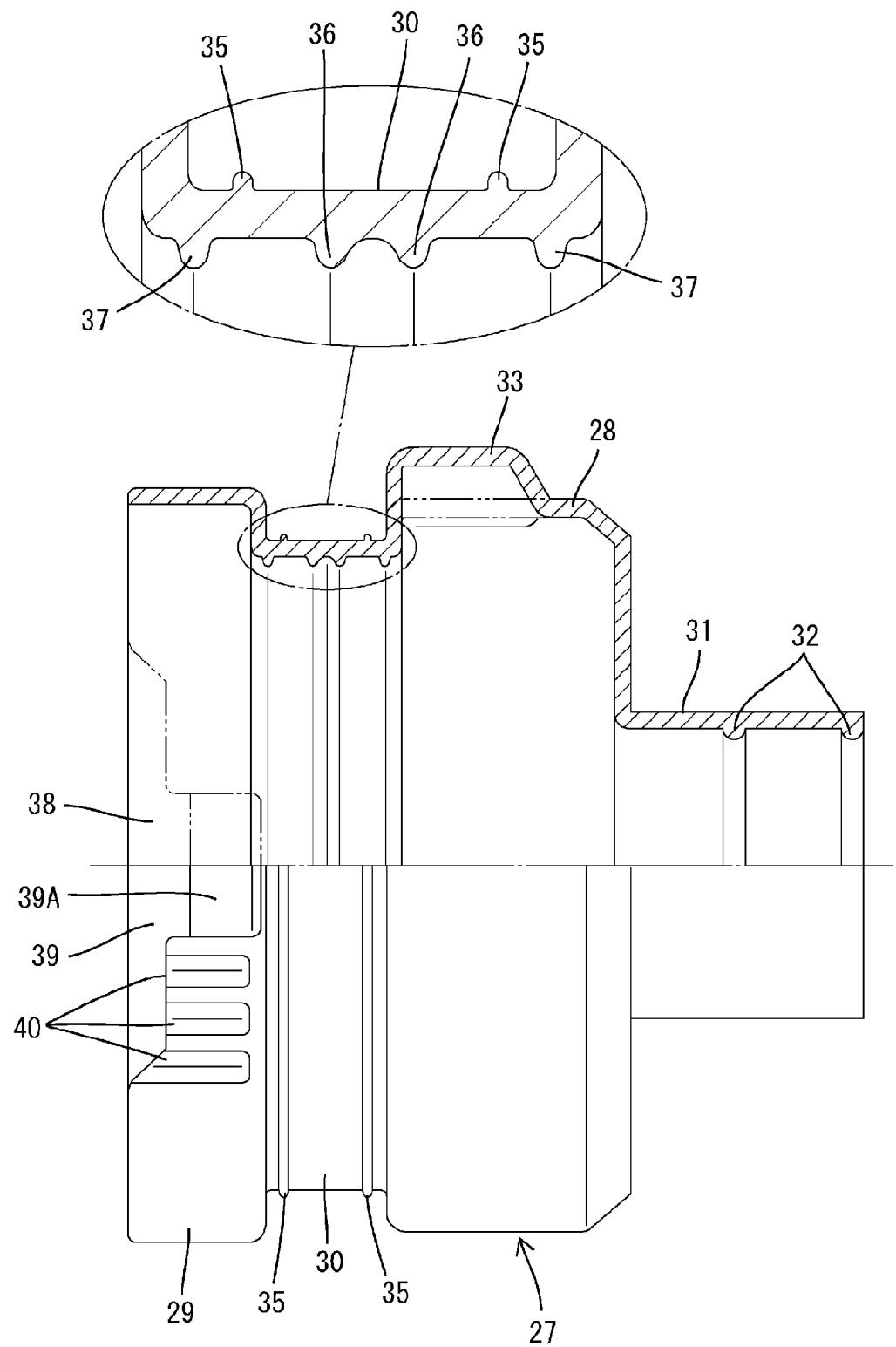
FIG. 2 is a partial cross-sectional plan view of a grommet.

A grommet 27 is made of a single piece of an elastic rubber material in a hollow shape. As shown in FIG. 2, the grommet 27 is configured to include a main portion 28, a skirt portion 29, and a band-fastened portion 30 interposed therebetween. The main portion 28 has an extending tubular portion 31 that extends rearward. The extending tubular portion 31 is formed in a cylindrical shape through which the wire harness W can be inserted, and is formed coaxially with the axis of the entire grommet 27. As shown in FIG. 4, sealing edges 32 are formed along the entire circumferences at the opening edge and the position entering forward from the opening edge on the inner circumferential surface of the extending tubular portion 31.

The main portion 28 is formed to have an oval cross section that can be matched with the outer circumferential surface of the connecting portion 19 of a shielding case, and the main portion 28 is formed so as to be capable of surround the entire outer circumferential surface of the front half portion of the connecting portion 19 in a state where the grommet 27 covers the shielding shell 15.

It should be noted that as shown in FIG. 2 and FIG. 5, an expanded portion 33 is formed at the position on the band-fastened portion 30 side on the outer side surface of the main portion 28, expanding outward in the width direction. The inside of the expanded portion 33 is a space for accommodating a fastening portion (portion fastened by the screw 24) of the fastening tool 23 that fastens the above-described braided wire 8 to the connecting portion 19 of the shielding shell 15.

The band-fastened portion 30 is formed in a recess groove shape and connects the skirt portion 29 and the main portion 28. Accordingly, its cross section has an oval shape that is slightly smaller than the main portion 28. A bundling band 34 made of resin (this may be made of metal) fastens the outer circumferential surface of the band-fastened portion 30. The bundling band 34 has a width dimension (front-rear width) that is shorter than that of the band-fastened portion 30. The bundling band 34 itself is well known and thus is not described in detail. As the bundling band 34, it is possible to use a band in which one end serves as an inserting end and the other end is provided with a locking portion that can lock the one end at any position after the one end is inserted thereto.

In the band-fastened portion 30, both border walls on the connecting portion 19 side and the skirt portion 29 side have a substantially vertically rising shape and can position the above-described bundling band 34 in the front-rear direction. Moreover, in this embodiment, a pair of positioning projections 35 that are spaced apart from each other in the front-rear direction projects from the entire outer circumferential surface of the band-fastened portion 30 as shown by the enlarged view in FIG. 4. The positioning projections 35 are formed so that a gap therebetween is slightly larger than the width dimension of the bundling band 34, and thus it is possible to more accurately position the bundling band 34. In the band-fastened portion 30, a region interposed between both positioning projections 35 is fastened by the bundling band 34 (a region in which the front-rear width range of the bundling band 34 is projected toward the band-fastened portion side).

On the other hand, as shown in FIG. 4, a pair of sealing lips 36 (projecting portions) that are spaced apart from each other in the front-rear direction (with a gap therebetween that is narrower than the gap between the positioning projections 35) projects from the entire inner circumferential surface of the band-fastened portion 30. Both sealing lips 36 are disposed in a region corresponding to the region between the positions at which both positioning projections 35 are provided. That is, both sealing lips 36 are provided in a region corresponding to the above-described region fastened by the bundling band 34, and when the bundling band 34 fastens that region, both sealing lips 36 are moderately squeezed and come into intimate contact along the outer circumferential surface of the front half portion of the connecting portion 19. Both sealing lips 36 are set to project with a dimension that is larger than the projecting height of the positioning projection 35 and to ensure a sufficient squeezing allowance with respect to the connecting portion 19.

A pair of auxiliary lips 37 (auxiliary projecting portions) that are spaced apart from each other in the front-rear direction projects from the entire inner circumferential surface of the band-fastened portion 30. As shown in the drawing, the projecting height of the auxiliary lip 37 is set to be substantially the same height as that of the sealing lip 36. Moreover, both auxiliary lips 37 are disposed at the positions outside with respect to both positioning projections 35 in the front-rear direction. That is, both auxiliary lips 37 are disposed in regions outside with respect to the region fastened by the bundling band 34, on which the fastening force by the bundling band 34 does not directly act. Accordingly, in a state where the bundling band 34 fastens that region, the squeezed amount of the auxiliary lip 37 is smaller than that of the sealing lip 36. However, the auxiliary lip 37 correspondingly has an excellent durability compared with the sealing lip 36, and it can be expected to maintain the sealing performance for a long period of time.

The grommet 27 of this embodiment has a shape in which the skirt portion 29 extends further rearward from the band-fastened portion 30. The skirt portion 29 is open rearward, and is formed to have an oval cross section that can be fitted to the outer circumferential surface of the step portion 16 of the shielding shell 15. The skirt portion 29 is formed to come into intimate contact along the outer circumferential surface of the step portion 16 together with the rising wall rising from the band-fastened portion 30 in a state where the grommet 27 is attached to the shielding shell 15.

Moreover, the skirt portion 29 excluding a part of its upper surface is formed to have substantially the same front-rear width as the front-rear width of the step portion 16. As shown in FIGS. 2 and 3, a cut-out portion 38 is formed at the front edge portion of the region near the central portion of the upper surface of the skirt portion 29, that is, the region in which the above-described reinforcing ribs 25 of the shielding shell 15 are formed, in order to prevent interference with the reinforcing ribs 25. The central portion in the width direction of the front edge of the cut-out portion 38 is provided with a recess 39 by cutting out a range of a predetermined width. The recess 39 is for preventing interference with the bolt cap 21, and a region on the front side of the portion in which the recess 39 is formed is formed into a thin portion 39A that is thinner than its surroundings (by thinning the outer surface side).

Three turn-up preventing ribs 40 (ribs) are formed on both sides interposing the recess 39 of the cut-out portion 38 in the width direction. The turn-up preventing ribs 40 are each formed in the front-rear direction so that the front edges face the edge portion of the cut-out portion 38.

Next, the effects of this embodiment configured as described above will be described. Initially, an example of operations for connecting the end portion of the wire harness W to the casing 1 is described. First, the harness-side connector 11, the shielding shell 15, and the grommet 27 are attached to the end portion of the wire harness W (as shown in FIG. 1). The harness-side connector 11 and the casing-side connector 3 are then fitted to each other. Thereafter, the cap portion 17 of the shielding shell 15 is caused to hit against the wall surface of the casing 1, concealing the projecting portion of the casing-side connector 3 and the boss portion 6. When the bolt 18 is screwed into the bolt hole 7 of the boss portion 6 in this state, the shielding shell 15 is fixed, and as a result, the operations for connecting the end portion of the wire harness W to the casing 1 side are completed.

Incidentally, as previously described, high-pressure washing water is sometimes blown to the portion in which the end portion of the wire harness W is connected to the casing 1. In order to prepare for such a case, in the grommet 27, the skirt portion 29 further extends from the band-fastened portion 30 and is brought into intimate contact with the step portion 16 of the shielding shell 15. That is, although the band-fastened portion 30 is usually formed as the end portion of the grommet 27, in this embodiment, by extending the skirt portion 29, it is possible to elongate a channel through which water infiltrates inside the grommet 27 and to enhance water resistance.

Moreover, the skirt portion 29 of the grommet 27 is provided with the cut-out portion 38 in order to prevent interference with the reinforcing ribs 25 of the shielding shell 15. However, the front-rear width of the skirt portion 29 is short in the width region provided with the cut-out portion 38, and as a result, the skirt portion 29 is likely to turn up when receiving the pressure of high-pressure washing water. Therefore, the cut-out portion 38 is provided with the turn-up preventing ribs 40 in the front-rear direction to suppress the deformation of the cut-out portion 38 in the direction in which the cut-out portion 38 turns up. Accordingly, the concern is reduced that sealing performance is deteriorated due to forming the cut-out portion 38.

Moreover, since the sealing lips 36 are formed on the inner circumferential surface of the band-fastened portion 30 and the fastening force by the bundling band 34 acts on the sealing lips 36, the sealing lips 36 come into intimate contact with the outer circumferential surface of the connecting portion 19 of the shielding shell 15 with a sufficient squeezed amount, and therefore, it is possible to obtain high sealing performance.

Furthermore, since the band-fastened portion 30 is formed in a recess groove shape between the main portion 28 and the skirt portion 29, it is possible to roughly position the bundling band 34 in the front-rear direction. Accordingly, since the bundling band 34 is prevented from being attached to the band-fastened portion 30 in a state where the bundling band 34 is largely inclined in the front-rear direction, it is possible to stabilize the condition where the sealing lips 36 are squeezed. In particular, in this embodiment, the pair of positioning projections 35 is provided on the outer circumferential surface of the band-fastened portion 30, and thus it is possible to accurately position the bundling band 34 between the positioning projections 35. Therefore, it is possible to cause the fastening force to reliably act on the sealing lips 36.

Furthermore, there is a concern that the sealing lips 36 are likely to be deteriorated by receiving the fastening force by the bundling band 34. As a measure taken against such a problem, in this embodiment, the auxiliary lips 37 are formed outside the region to be fastened, and a constant sealing force is also obtained at that region. Accordingly, it is possible to maintain a constant sealing function for a long period of time.

Other Embodiments

The present invention is not limited to the embodiment explained by the above description and the drawings. Other embodiments, which will be explained below, for example, are also included in the technical scope of the present invention.

(1) Although, in the above-described embodiment, a connector was provided at the end portion of the wire harness W, the connector can be omitted. The electric wires W1 may be introduced into the casing 1 as they are, and may be directly connected to an electric apparatus in the casing 1.

(2) Although, in the above-described embodiment, the shielding shell 15 was used as an attachment member, a shell having no shielding function may be used.

(3) Although, in the above-described embodiment, the extending tubular portion 31 of the grommet 27 had a straight cylindrical shape, a portion having a bellows shape may extend instead of the extending tubular portion 31 having such a shape so that a bending wiring is possible.

(4) In the above-described embodiment, the positioning projections 35 were provided on the outer circumferential surface of the band-fastened portion 30. These positioning projections 35 are useful when the width (front-rear width) of the band-fastened portion 30 is sufficiently larger than that of the bundling band 34. Therefore, when the width of the band-fastened portion 30 is slightly larger than that of the bundling band, the positioning projections 35 can be omitted.

(5) Although the pair of auxiliary lips 37 was provided in the above-described embodiment, only one of the auxiliary lips may be provided, and on the contrary, three or more auxiliary lips may be provided.

(6) Although, in the above-described embodiment, the case where the sealing lips 36 and the auxiliary lips 37 were formed on the entire circumference was shown as a preferred embodiment, they may be partially omitted at the positions where no sealing is required or may be omitted to the extent that the sealing performance is not lost.

LIST OF REFERENCE NUMERALS

1 . . . casing
15 . . . shielding shell (attachment member)
16 . . . step portion
19 . . . connecting portion
22 . . . opening
27 . . . grommet
28 . . . main portion
29 . . . skirt portion
30 . . . band-fastened portion
34 . . . bundling band
36 . . . sealing lip (projecting portion)
37 . . . auxiliary lip (auxiliary projecting portion)
38 . . . cut-out portion
40 . . . turn-up preventing rib (rib)
W . . . wire harness (electric wire group)
W1 . . . electric wire

The invention claimed is:

1. A grommet having a main portion for covering a tubular connecting portion of an attachment member in a condition in which electric wires are inserted through an opening, the attachment member including the connecting portion having the opening at one end and a step portion formed to be continuous with the other end of the connecting portion and to have a larger diameter than the connecting portion, the grommet comprising:
a band-fastened portion that extends from the main portion and is configured to be brought into intimate contact with the connecting portion; and
a skirt portion that extends from the band-fastened portion and is for covering the step portion in an intimate contact condition; and
wherein the band-fastened portion is formed in a recess groove shape in a circumferential direction and connects the main portion and the skirt portion, the band-fastened portion configured to be fastened by a bundling band from an outside.

2. The grommet according to claim 1, wherein the band-fastened portion is provided with projecting portions that project from the inner circumferential surface and are configured to be brought into intimate contact with the connecting portion by being fastened by the bundling band.

3. The grommet according to claim 2, wherein auxiliary projecting portions project from the inner circumferential surface of regions outside the region that is to be fastened by the bundling band in the band-fastened portion.

4. The grommet according to claim 1, wherein a cut-out portion is formed in a partial region of an opening edge of the skirt portion by cutting out that region toward the one end, and ribs are formed in regions outside the cut-out portion to extend from the one end side to the other end side.

5. An attachment member with a grommet comprising:
an attachment member including a tubular connecting portion having an opening at one end and a step portion formed to be continuous with the other end of the connecting portion and to have a larger diameter than the connecting portion; and
a grommet having a main portion for covering the connecting portion in a condition in which electric wires are inserted through the opening,
wherein the grommet comprises:
a skirt portion that extends from the main portion and is for covering the step portion; and
a band-fastened portion that is formed in a recess groove shape and connects the main portion and the skirt portion, and has an inner circumferential surface configured to be brought into intimate contact with the connecting portion by being fastened by a bundling band from an outside.

6. The attachment member with a grommet according to claim 5, wherein the band-fastened portion is provided with projecting portions that project from the inner circumferential surface and are configured to be brought into intimate contact with the connecting portion by being fastened by the bundling band.

7. The attachment member with a grommet according to claim 6, wherein auxiliary projecting portions project from the inner circumferential surface of regions outside the region that is to be fastened by the bundling band in the band-fastened portion.

8. The attachment member with a grommet according to claim 5, wherein a cut-out portion is formed in a partial region of an opening edge of the skirt portion by cutting out that region toward the one end, and ribs are formed in regions outside the cut-out portion to extend from the one end side to the other end side.

\* \* \* \* \*